(12) United States Patent
Pham et al.

(10) Patent No.: US 7,271,972 B1
(45) Date of Patent: Sep. 18, 2007

(54) METHOD AND APPARATUS FOR REDUCING SEEK ACOUSTICS USING A VARIABLE-BANDWIDTH LOW-PASS FILTER

(75) Inventors: Ich V. Pham, San Jose, CA (US); Johnny Si-Pau Pong, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 93 days.

(21) Appl. No.: 10/237,259

(22) Filed: Sep. 6, 2002

Related U.S. Application Data

(60) Provisional application No. 60/318,159, filed on Sep. 6, 2001.

(51) Int. Cl.
*G11B 21/02* (2006.01)
*G11B 5/55* (2006.01)

(52) U.S. Cl. ..................... 360/75; 360/78.01
(58) Field of Classification Search .......... 360/78.04, 360/78.06, 75; 318/560; 369/44, 28
See application file for complete search history.

(56) References Cited

U.S. PATENT DOCUMENTS

| | | | |
|---|---|---|---|
| 3,355,668 A * | 11/1967 | Boensel et al. ............ 327/556 |
| 3,436,670 A * | 4/1969 | Solomon .................... 330/293 |
| 4,172,267 A * | 10/1979 | Sidman .................... 360/78.04 |
| 4,972,350 A * | 11/1990 | Sander et al. ............ 369/44.28 |
| 5,155,422 A * | 10/1992 | Sidman et al. ............. 318/560 |
| 5,291,110 A * | 3/1994 | Andrews et al. ............ 318/560 |
| 5,369,345 A * | 11/1994 | Phan et al. ................. 318/561 |
| 5,465,034 A | 11/1995 | Andrews, Jr. et al. ...... 318/560 |
| 5,475,545 A * | 12/1995 | Hampshire et al. ...... 360/78.06 |
| 5,901,009 A | 5/1999 | Sri-Jayantha et al. .... 360/78.07 |
| 6,140,791 A | 10/2000 | Zhang ........................ 318/632 |
| 6,148,240 A | 11/2000 | Wang et al. .................. 700/63 |
| 6,204,988 B1 * | 3/2001 | Codilian et al. ............. 360/75 |
| 6,256,163 B1 | 7/2001 | Schmidt et al. .......... 360/78.09 |

OTHER PUBLICATIONS

Miu, Denny K. et al.; "Minimum Power and Minimum Jerk Position Control and its Applications in Computer Disk Drives"; *IEEE Transactions on Magnetics*; vol. 27; No. 6, Nov. 1991; pp. 4471-4475.

* cited by examiner

*Primary Examiner*—K. Wong
(74) *Attorney, Agent, or Firm*—Myers Bigel Sibley & Sajovec, P.A.

(57) ABSTRACT

A method and apparatus for reducing seek acoustics in a disk drive using a variable-bandwidth low-pass filter is provided. The variable-bandwidth low-pass filter is used to adaptively shape a control signal supplied to a VCM for moving a head relative to a disk surface during a seek operation. The bandwidth of the variable-bandwidth low-pass filter is dependent upon head position relative to a target track.

64 Claims, 6 Drawing Sheets

METHOD AND APPARATUS FOR REDUCING SEEK ACOUSTICS USING A VARIABLE-BANDWIDTH LOW-PASS FILTER

CROSS-REFERENCE TO RELATED APPLICATIONS

Priority is claimed from U.S. Provisional Patent Application Ser. No. 60/318,159 filed Sep. 6, 2001, which is incorporated herein by reference in its entirety.

FIELD OF THE INVENTION

The present invention relates to computer disk drives. More particularly, the present invention relates to reducing seek acoustics in a disk drive.

BACKGROUND OF THE INVENTION

Computer disk drives store information on magnetic disks. Typically, the information is stored on each disk in concentric tracks, divided into sectors. Information is written to and read from a disk by a head (or transducer), which is mounted on an actuator arm capable of moving the head radially over the disk. Accordingly, the movement of the actuator arm allows the head to access different tracks. The disk is rotated by a spindle motor at a high speed, allowing the head to access different sectors on the disk. The head may include separate or integrated read and write elements.

A disk drive 10 is illustrated in FIG. 1. The disk drive comprises a disk 12 that is rotated by a spin motor 14. The spin motor 14 is mounted to a base plate 16. The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device. Instead of a one disk configuration (shown in FIG. 1), the disk drive 10 may include a plurality of disks 12 and, therefore, a plurality of corresponding actuator arm assemblies 18.

FIG. 2 is a diagrammatic representation of a simplified top view of a disk 12 having a surface 42 which has been formatted to be used in conjunction with a sectored servo system (also known as an embedded servo system). As illustrated in FIG. 2, the disk 12 includes a plurality of concentric tracks 44a-44h for storing data on the disk's surface 42. Although FIG. 2 only shows a relatively small number of tracks (i.e., 8) for ease of illustration, it should be appreciated that typically tens of thousands of tracks are included on the surface 42 of a disk 12.

Each track 44a-44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54).

One of the operations that a disk drive performs is known as a seek operation. During a seek operation, the head 20 is moved from a present track of the disk to a target track of the disk, so that a data transfer can be performed with the target track. In order for a seek operation to be performed, a current is delivered to the VCM 28 of the disk drive, which causes the actuator arm 24 to rotate, thereby moving the head 20 radially relative to the disk surface 42.

It is desirable to perform seek operations as quickly as possible. Accordingly, in conventional long seek operations, for example, a maximum current will be applied to the VCM 28 in a first direction for a period of time to accelerate the head 20 towards a maximum velocity as it moves towards the desired track. Once the head 20 reaches its maximum velocity, no current is applied to the VCM 28 and the head 20 coasts at its maximum velocity for a period of time. Just prior to reaching the target track, in order to decelerate the head 20, a maximum current is applied to the VCM 28 in a direction opposite to the first direction, such that the head 20 is positioned near the target track. Once near the target track, the drive 10 may enter a linear mode to position the head 20 more closely to the target track. A diagrammatic representation of such a bang-coast-bang current profile is illustrated in FIG. 3.

Application of currents in such a fashion causes abrupt changes in the acceleration and deceleration of the head. This tends to excite vibration modes in the drive, which can cause acoustic noise due to seek operations (also known as seek acoustics). If seek acoustics are not kept within acceptable levels, a disk drive may fail to meet qualification standards, which reduces drive yields and increases the overall manufacturing costs of disk drives.

Accordingly, it would be advantageous to provide a method and apparatus for reducing seek acoustics in a disk drive system. At the same time, however, it would be desirable to provide such a method and apparatus, which does not significantly compromise seek performance.

SUMMARY OF THE INVENTION

The present invention is designed to meet the aforementioned, and other, needs. The invention is directed to a method and apparatus for reducing seek acoustics in a disk drive using a variable-bandwidth low-pass filter. Specifically, the variable-bandwidth low-pass filter is used to adaptively shape a control signal supplied to a VCM to move a head relative to a disk surface during a seek operation. The bandwidth of the variable-bandwidth low-pass filter is dependent upon a calculated number of tracks between a position of the head and a target track (i.e., tracks-to-go).

In one embodiment, the variable-bandwidth low-pass filter has a first bandwidth when the head is at a first position which is greater than a first number of tracks-to-go and the variable-bandwidth low-pass filter has a second bandwidth when the head is at a second position which is less than a second number of tracks-to-go. In another embodiment, the variable-bandwidth low-pass filter has bandwidths that are determined by linear interpolation when the head is positioned between the first position and the second position.

Other embodiments, objects, features and advantages of the invention will be apparent from the following specification taken in conjunction with the following drawings.

DETAILED DESCRIPTION OF THE PREFERRED EMBODIMENT

Figure 1:
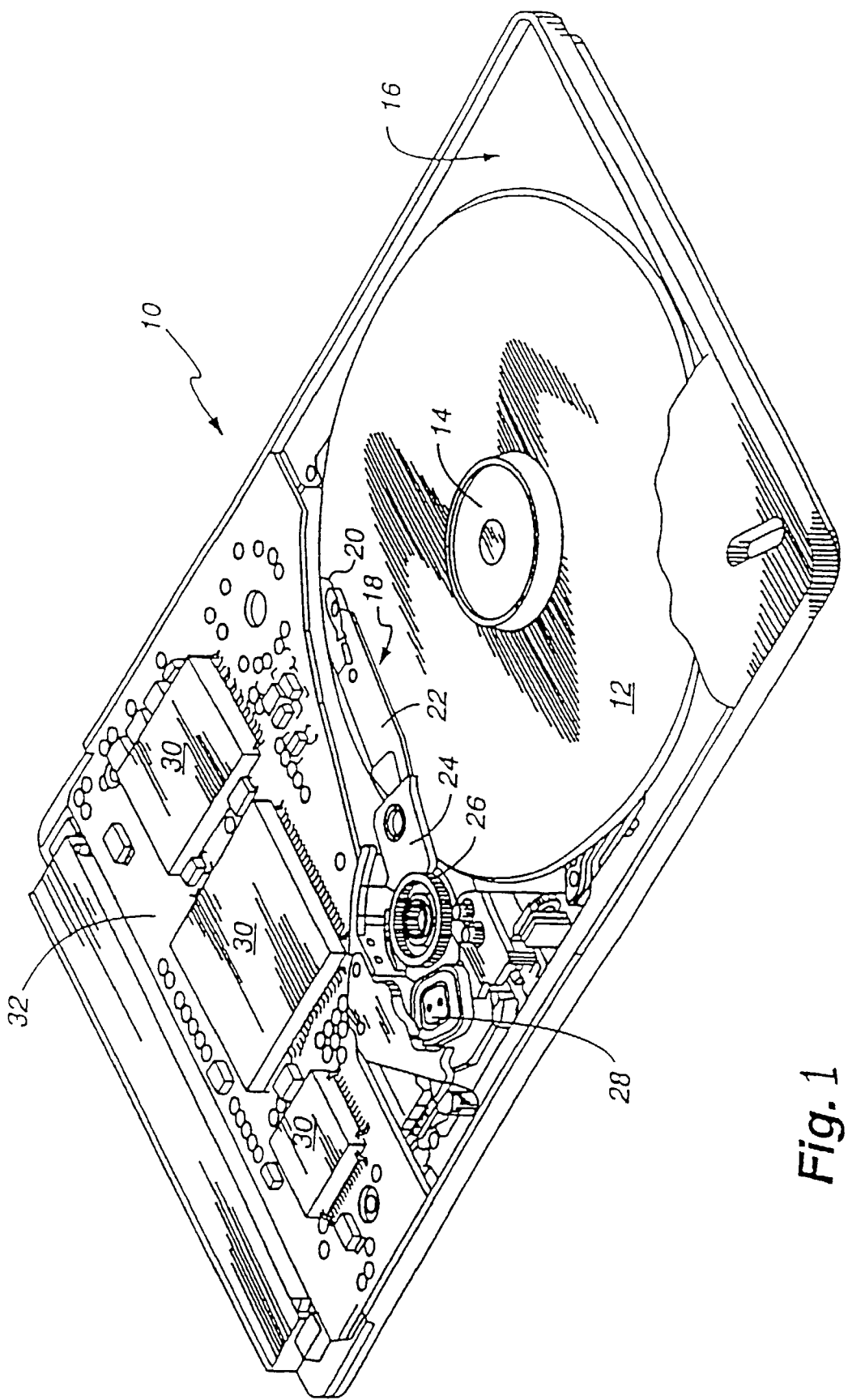
FIG. 1 is a diagrammatic representation of a conventional disk drive.
Figure 2:
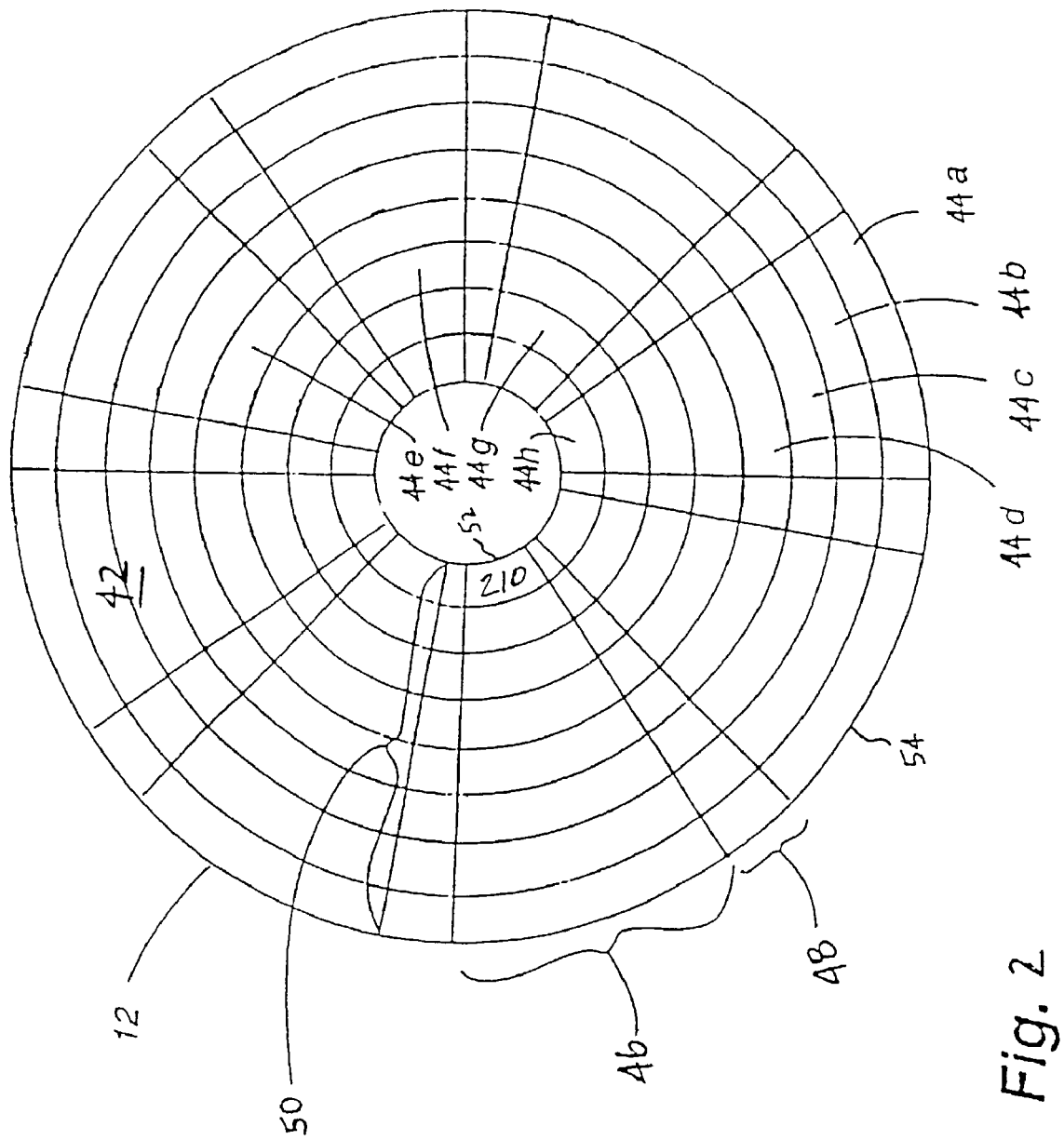
FIG. 2 is a diagrammatic representation illustrating a conventional disk surface that has been formatted to be used in conjunction with a sectored servo system.
Figure 3:
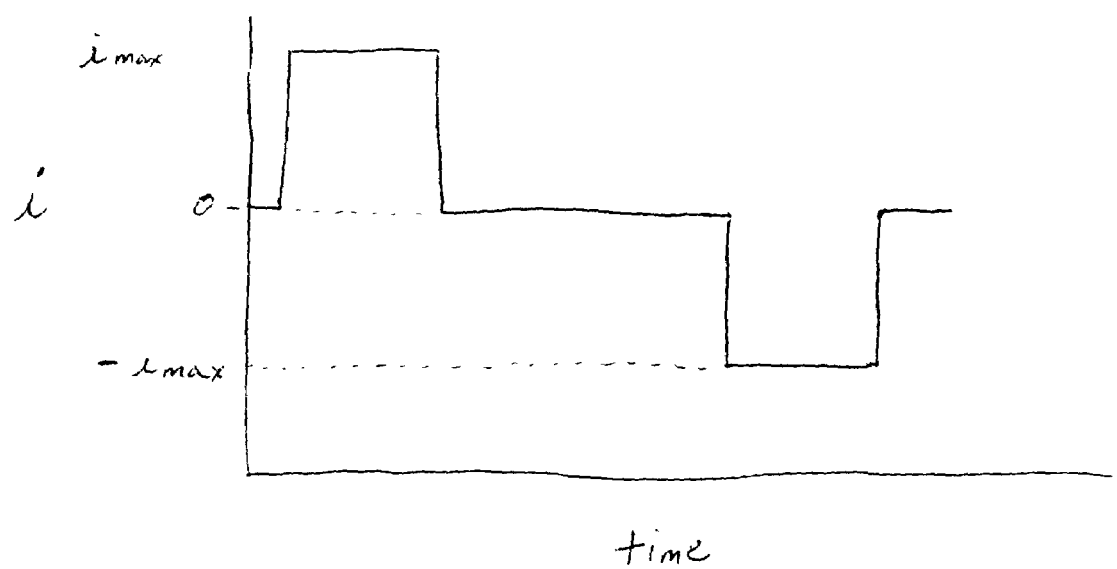
FIG. 3 is a diagrammatic representation of a conventional bang-coast-bang current profile.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to reducing seek acoustics in a disk drive. This is accomplished through use of a variable-bandwidth low-pass filter, which varies as a function of tracks-to-go and which is used to adaptively shape a control signal applied to a VCM. Importantly, while a single seek operation is being performed, the low pass filter has at least two different bandwidths which are used to shape the control signal applied to the VCM. Through use of the variable-bandwidth low-pass filter, fewer mechanical resonances are excited by the control signal applied to the VCM. Accordingly, acoustic noise is reduced.

Figure 4:
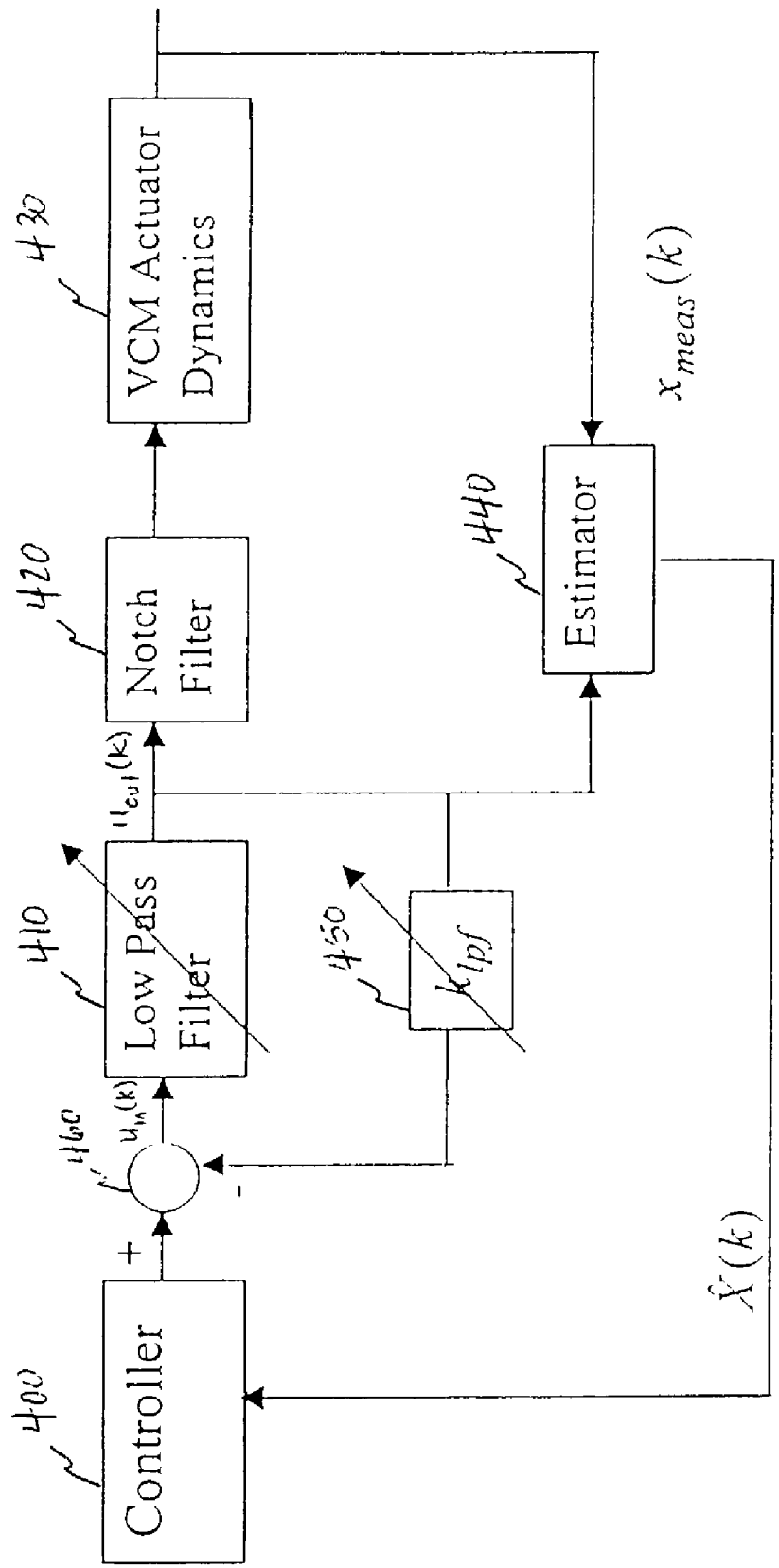
FIG. 4 is a simplified block diagram illustrating a servo block diagram in accordance with one embodiment of the present invention.

FIG. 4 is a servo block diagram for a seek operation that illustrates a one embodiment of the present invention. The entirety of the invention may be implemented in firmware or software.

The servo block diagram shows a controller 400, variable-bandwidth low-pass filter 410, notch filter 420, VCM actuator dynamics 430, estimator 440 and variable-bandwidth low-pass filter feedback block 450. Except for variable-bandwidth low-pass filter 410 and the variable-bandwidth low-pass filter feedback block 450, the blocks shown in FIG. 4 are conventional.

With reference to FIG. 4, the controller 400 calculates a control current based upon an input received from the state estimator 440. The output of the controller 400 is delivered to summing junction 460. In contrast to some prior art systems, the controller 400 preferably does not include feedforward and anticipation functions when performing seek operations.

A signal corresponding to a last sample from the variable-bandwidth low-pass filter feedback block 450 is also delivered to the summing junction and is subtracted from the signal which was output from controller 400. The variable-bandwidth low-pass filter feedback block 450 is included in the servo system in order to ensure stability.

The output of the summing junction 460 is the input to the variable-bandwidth low-pass filter 410 and is represented by signal $u_{in}(k)$. Such signal is filtered by variable-bandwidth low-pass filter 410, which has a bandwidth that varies based upon the number of tracks between the present track position of the head and the target track (also known as the tracks-to-go or position-to-go). The variable bandwidth will be described in greater detail below.

The output of the low pass filter 410 is represented by signal $u_{out}(k)$ and is delivered to notch filter 420, estimator 440 and variable-bandwidth low-pass filter feedback block 450. The notch filter 420 removes certain acoustic resonant modes. In general, each additional resonant mode removed by notch filter 420 reduces the stability of the servo system. Accordingly, in general, the notch filter 420 is not able to be used to remove all of the acoustic resonant modes without affecting the stability of servo system.

The output of the notch filter 420 is delivered to VCM Actuator Dynamics 430, which represents the plant of the system. The output of the notch filter 420 is representative of the control signal delivered to the VCM.

Due to the application of the control signal to the VCM, the head is moved to a new position, which is measured using servo information located on a disk surface. The measured position of the head is represented by signal $x_{meas}(k)$ and is delivered to state estimator 440. The state estimator 440 is used to update estimated states of estimated matrix, $\hat{X}(k)$, using the measured position of the head.

Various computations are performed by a microprocessor associated with the disk drive. Certain relevant equations, which are used in performing such computations, will now be presented herein.

With reference to the state estimator 440, states of the estimated matrix $\hat{X}(k)$ are updated by a microprocessor according to the following equation:

$$\hat{X}(k) = \overline{X}(k) + L(x_{meas}(k) - \overline{x}_1(k)) \quad \text{(Equation 1)}$$

where $\hat{X}(k)$ is a matrix which includes estimated position $\hat{x}_1(k)$, estimated velocity $\hat{x}_2(k)$, estimated bias $\hat{x}_3(k)$ and estimated coil current $\hat{x}_4(k)$; where $\overline{X}(k)$ is a matrix which includes predicted position $\overline{x}_1(k)$, predicted velocity $\overline{x}_2(k)$, predicted bias $\overline{x}_3(k)$ and predicted coil current $\overline{x}_4(k)$; L is the estimator gain 4×1 vector; and, $x_{meas}(k)$ is the measured position.

A microprocessor is also used to calculate the feedback control signal $u_{in}(k)$. However, as mentioned above, the feedback control signal is dependent upon the position-to-go, $x_{xtg}(k)$, which is measured in tracks and is given by:

$$x_{xtg}(k) = x_{target} - \hat{x}_1(k) \quad \text{(Equation 2)}$$

where $x_{target}$ is the target track and $\hat{x}_1(k)$ is the estimated position of the head, which is output by the estimator 440. Thus, the feedback control signal $u_{in}(k)$ is given by:

$$u_{in}(k) = k_v(f(x_{xtg}(k)) - \hat{x}_2(k)) - \hat{x}_3(k) - k_d(u_{in}(k-1) + \hat{x}_3(k)) - k_{lpf}u_{out}(k) \quad \text{(Equation 3)}$$

where $u_{in}(k)$ is the feedback control signal which is input to the variable-bandwidth low-pass filter 410; $x_{xtg}(k)$ is the distance-to-go from the target; $k_v$ is the velocity feedback gain; f(.) is the velocity trajectory, which calculates a velocity command based on $x_{xtg}(k)$; $k_d$ is the control delay feedback gain; $k_{lpf}$ is the variable-bandwidth low-pass filter state feedback gain; $\hat{x}_2(k)$ is the estimated velocity; $\hat{x}_3(k)$ is the estimated bias; $u_{in}(k-1)$ is the prior feedback control signal; and, $u_{out}(k)$ is the variable-bandwidth low-pass filter output.

A microprocessor limits $u_{in}(k)$ to its maximum allowable power amplifier control value and then processes it through the variable-bandwidth low-pass filter 410. The output of the variable-bandwidth low-pass filter is given by:

$$u_{out}(k) = B_0 u_{in}(k) + B_1 u_{in}(k-1) - A_1 u_{out}(k-1) \quad \text{(Equation 4)}$$

where $u_{out}(k)$ is the output of the variable-bandwidth low-pass filter 410; $B_0$, $B_1$ and $A_1$ are first-order low-pass filter coefficients for a Butterworth filter, which are given by Equations 6, 7 and 8 (below); $u_{in}(k)$ is the input to the variable-bandwidth low-pass filter; $u_{in}(k-1)$ is the prior feedback control signal; and $u_{out}(k-1)$ is the prior output signal from the variable-bandwidth low-pass filter.

As alluded to above, Equation 4 is an equation that may be used with a first-order Butterworth filter. It should be understood that the present invention is not limited to a first-order Butterworth filter. Accordingly, the equation will vary based upon the type of filter used (e.g., second-order Butterworth filter, first-order Chebyshev filter, etc.).

bandwidth of approximately 100 Hz when the absolute value of $x_{xtg}(k)$ is more than 10,000 tracks and a bandwidth of approximately 7 kHz when the absolute value of $x_{xtg}(k)$ is less than about 643 tracks. When the absolute value of $x_{xtg}(k)$ is between 10,000 tracks and 643 tracks, the bandwidth of the variable-bandwidth low-pass filter is linearly interpolated. Equations 6, 7, 8 and 9 (below) are based upon the exemplary disk drive and demonstrate how the low pass filter coefficients are calculated. Furthermore, the FIGS. 5-7 and 8-10, which will be discussed in detail below, are also based upon the exemplary disk drive.

$$A_1 = \begin{cases} -0.96 & \text{for} & |x_{xtg}(k)| > 10000 \text{ tracks} \\ a_{slope}(|x_{xtg}(k)| - x_{approach}) + 0.5 & \text{for} & x_{approach} < |x_{xtg}(k)| < 10000 \text{ tracks} \\ 0.5 & \text{for} & |x_{xtg}(k)| < x_{approach} \end{cases} \quad \text{(Equation 6)}$$

$$B_0 = \frac{1 + A_1}{2} \quad \text{(Equation 7)}$$

$$B_1 = B_0 \quad \text{(Equation 8)}$$

$$a_{slope} = \frac{-1.46}{9357} \quad \text{(Equation 9)}$$

The output of the variable-bandwidth low-pass filter $u_{out}(k)$ is delivered to the notch filter 420 to generate a control signal, which is delivered to the VCM. A microprocessor then predicts the states for the next sample time using the following equation:

$$\overline{X}(k+1) = \Phi \hat{X}(k) + \Gamma_1 u_{out}(k-1) + \Gamma_2 u_{out}(k) \quad \text{(Equation 5)}$$

where $\overline{X}(k+1)$ is a predicted matrix (including predicted position $\overline{x}_1(k+1)$, predicted velocity $\overline{x}_2(k+1)$, predicted bias $\overline{x}_3(k+1)$ and predicted coil current $\overline{x}_4(k+1)$) for the next sample time; $\hat{X}(k)$ is an estimated matrix including estimated position $\hat{x}_1(k)$, estimated velocity $\hat{x}_2(k)$, estimated bias $\hat{x}_3(k)$ and estimated coil current $\hat{x}_4(k)$; $u_{out}(k-1)$ is the prior output of the variable-bandwidth low-pass filter; $u_{out}(k)$ is the output of the variable-bandwidth low-pass filter; and, $\phi$, $\Gamma_1$ and $\Gamma_2$ form a mathematical model of the power amplifier VCM actuator.

A microprocessor calculates the low pass filter coefficients based upon the distance-to-go $x_{xtg}(k)$, as set forth in Equations 6, 7 and 8. Again, the variable-bandwidth low-pass filter 410 of the present invention has a bandwidth that varies relative to position-to-go, $x_{xtg}(k)$.

In one embodiment, when performing a seek operation, the variable-bandwidth low-pass filter has a first bandwidth when the absolute value of $x_{xtg}(k)$ is more than a first number of tracks and has a second bandwidth when the absolute value of $x_{xtg}(k)$ is less than a second number of tracks, wherein the first bandwidth is much lower than the second bandwidth. In instances when the absolute value of $x_{xtg}(k)$ is between the first number of tracks and the second number of tracks, a linear interpolation is performed to adaptively obtain bandwidths for the variable-bandwidth low-pass filter across such range.

To assist in understanding the present invention, bandwidths for an exemplary disk drive will be discussed herein. In the exemplary disk drive, the low-pass filter may have a In Equation 6, $x_{approach}$ signifies a track location relative to the target track, where the seek operation is transitioned to a linear control mode. $x_{approach}$ is selected so as to ensure a smooth transition from seek mode to linear mode. In the exemplary disk drive, $x_{approach}$ is 643 tracks. Furthermore, $a_{slope}$ represents a linear interpolation between a first bandwidth at a first position and a second bandwidth at a second position. In the exemplary disk drive, $a_{slope}$ is calculated by the filter coefficient at 100 Hz (i.e., −0.96) subtracted from the filter coefficient at 7 kHz (i.e., 0.5) and then dividing the resultant value by the quantity represented by the number of tracks-to-go over which the bandwidth is 100 Hz (i.e., 10,000 tracks) subtracted from $x_{approach}$ (i.e., 643 tracks).

A microprocessor also calculates the low pass filter feedback gain, $k_{lpf}$, which is used to stabilize the servo in the presence of the variable-bandwidth low-pass filter. The low pass filter feedback gain, $k_{lpf}$, tracks the low pass filter and, therefore, is also a function of tracks-to-go, $x_{xtg}(k)$.

In one embodiment, when performing a seek operation, the low pass filter feedback gain has a first value when the absolute value of $x_{xtg}(k)$ is more than a first number of tracks and has a second value when the absolute value of $x_{xtg}(k)$ is less than a second number of tracks, wherein the first value is much greater than the second value. In instances when the absolute value of $x_{xtg}(k)$ is between the first number of tracks and the second number of tracks, a linear interpolation is performed to obtain values of the feedback gain across such range.

As a more specific example, in the exemplary disk drive, the low pass filter feedback gain may have a value of approximately 6 when the absolute value of $x_{xtg}(k)$ is more than 10,000 tracks and a value of approximately 0 when the absolute value of $x_{xtg}(k)$ is less than about 643 tracks (i.e., $x_{approach}$). When the absolute value of $x_{xtg}(k)$ is between 10,000 tracks and 643 tracks, the value of the low pass filter feedback gain is linearly interpolated. Equations 10 and 11 (below) are based upon this specific example and demonstrate how the low pass filter feedback gain is calculated.

$$k_{tpf} = \begin{cases} 6 & \text{for} & |x_{xtg}(k)| > 10000 \text{ tracks} \\ k_{slope}(|x_{xtg}(k)| - x_{approach}) & \text{for} & x_{approach} < |x_{xtg}(k)| < 10000 \text{ tracks} \\ 0 & \text{for} & |x_{xtg}(k)| < x_{approach} \end{cases} \quad \text{(Equation 10)}$$

$$k_{slope} = \frac{6}{9357} \quad \text{(Equation 11)}$$

Reference will now be made to FIGS. 5-7 and FIGS. 8-10, wherein a 40,000 track seek and a 10,000 track seek, respectively, will be discussed for an exemplary disk drive in accordance with one embodiment of the present invention.

Figure 6:
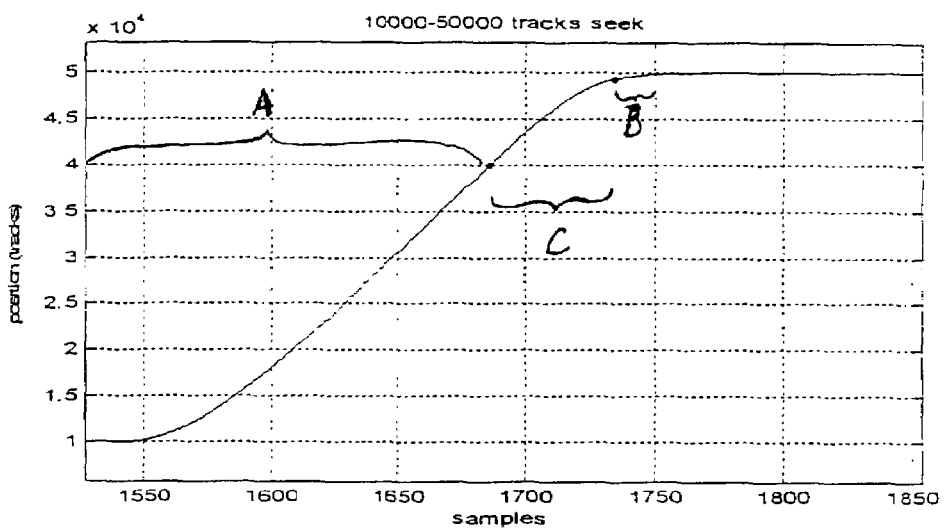

FIG. 6 is a graphical representation associated with seeking from a track position of 10,000 to a track position of 50,000 for the exemplary disk drive. As shown in FIG. 6, the position of the head in units of tracks is plotted as a function of number of servo samples (or time).

In the example of FIG. 6, the variable-bandwidth low-pass filter has a bandwidth of 100 Hz when the number of tracks-to-go is greater than 10,000 tracks. Accordingly, the low pass filter has a bandwidth of 100 Hz from the start of the seek when the head is positioned at track number 10,000 until the head is positioned at track number 40,000 (i.e., target track is 50,000 and track number is 40,000, so tracks-to-go is 10,000 when head is at track 40,000) as identified by Region A.

Furthermore, the variable-bandwidth low-pass filter has a bandwidth of 7 kHz when the number of tracks-to-go is less than or equal to 643 tracks. Accordingly, the low pass filter has a bandwidth of 7 kHz from the time the head is positioned at track number 49,357 until the time the head is positioned at track number 50,000 (i.e., the target track is 50,000 and the track number is 49,357, so tracks-to-go is 643 when the head is at track 49,357) as identified by Region B.

When the head is positioned between track number 40,000 and track number 49,357, which is identified by Region C in FIG. 6, the bandwidth of the low pass filter varies based upon the number of tracks-to-go. More specifically, the bandwidth is determined by performing a linear interpolation between the bandwidth at track number 40,000 and the bandwidth at track number 49,357, and is dependent upon the number of tracks-to-go.

Figure 5:
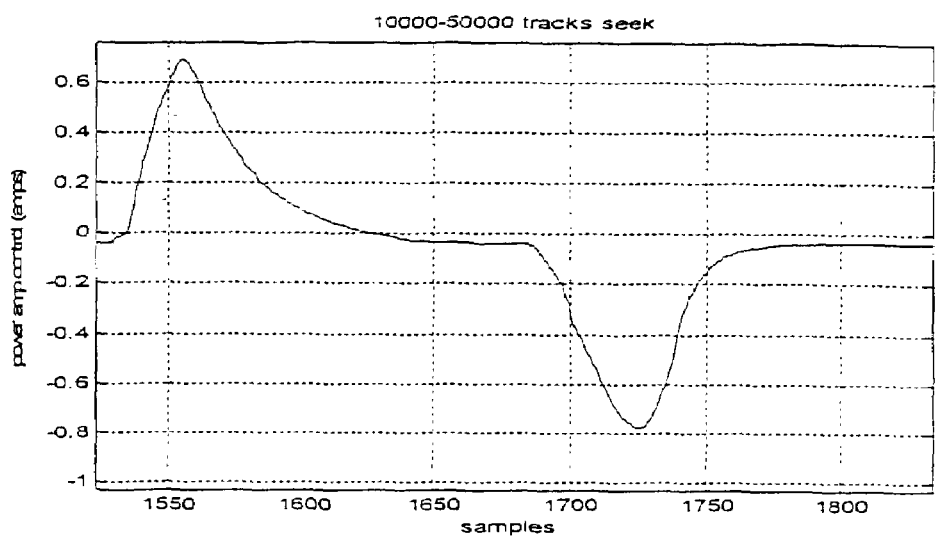
FIGS. 5-7 are graphical representations generated when performing a 40,000 track seek in an exemplary disk drive in accordance with one embodiment of the present invention; and, FIGS. 8-10 are graphical representations generated when performing a 10,000 track seek in the same exemplary disk drive used in generating FIGS. 5-7 in accordance with one embodiment of the present invention.

FIG. 5 is a graphical representation of a VCM control signal for a seek of 40,000 tracks that has been shaped using a variable-bandwidth low-pass filter in accordance with the present invention for the exemplary disk drive described in connection with FIG. 6. In FIG. 5, the control signal (in amps) is plotted relative to number of servo samples (or time). Furthermore, as shown in FIG. 5, the control signal has a relatively smooth, sinusoidal shape (with a coast section), which reduces the seek acoustics of the drive. As can be seen in FIG. 5, the rise and fall times of the VCM control signal are still relatively sharp, so that seek times are not significantly reduced.

Figure 7:
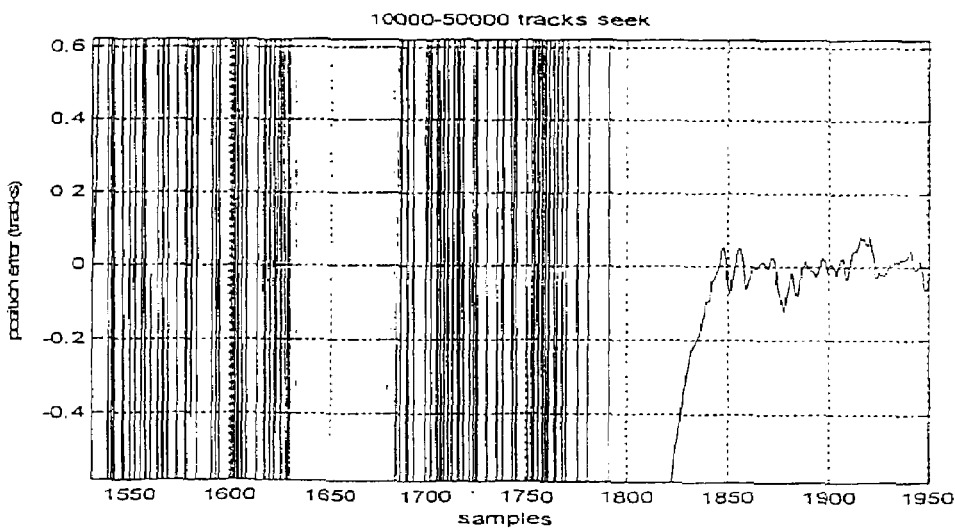

FIG. 7 is a graphical representation of position error (in tracks) plotted relative to number of servo samples (or time) for a seek from track number 10,000 to track number 50,000 using a VCM control current that has been shaped in accordance with the variable-bandwidth low-pass filter described in connection with FIGS. 5 and 6. FIG. 7 shows a smooth arrival to track number 50,000 without overshoot. The arrival of the seek has less ringing because both the acceleration and deceleration are smooth. More specifically, the figure shows that the head is less than 10% off-track when arriving at track number 50,000.

Figure 8:
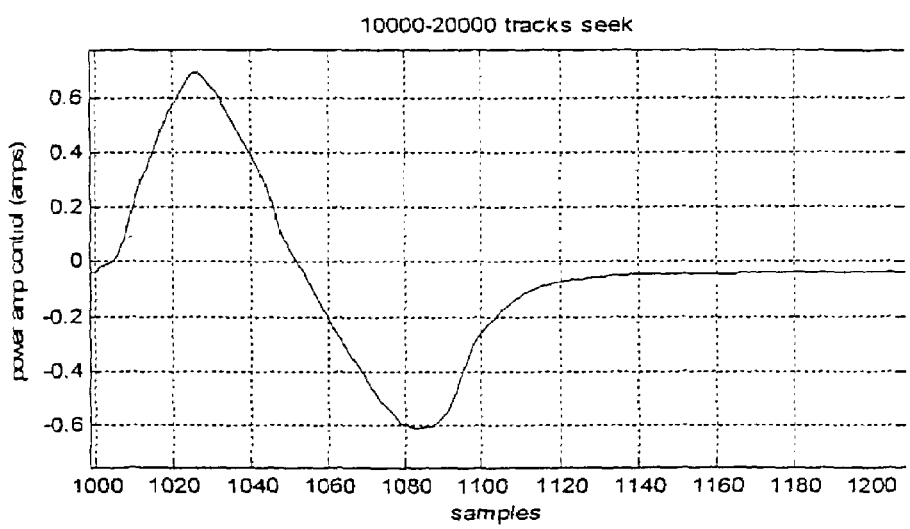
Figure 9:
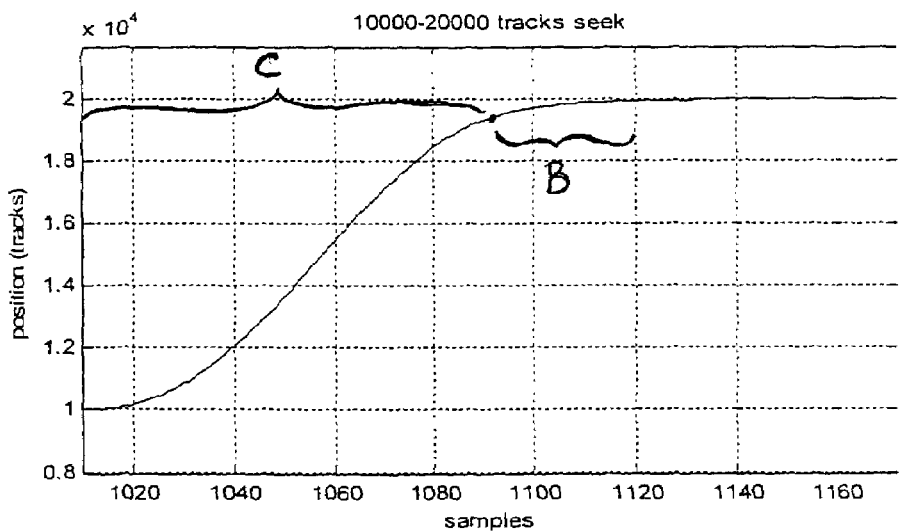
Figure 10:
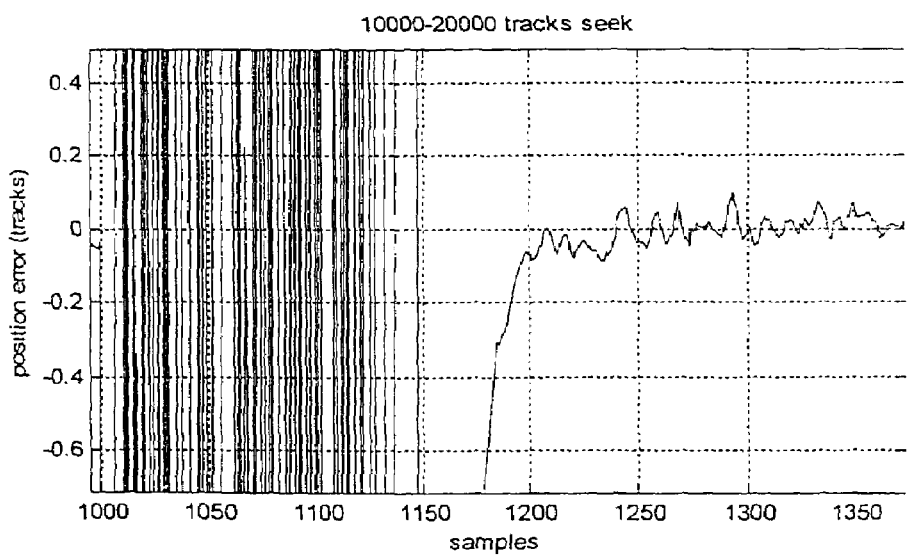

FIGS. 8, 9 and 10 are graphical representations associated with a 10,000 track seek (from track 10,000 to track 20,000) for the exemplary disk drive discussed in connection with FIGS. 5, 6 and 7.

FIG. 9 is a graphical representation, which is similar to FIG. 6, except that it is associated with seeking from a track position of 10,000 to a track position of 20,000. As shown in FIG. 9, the position of the head (in units of tracks) is plotted as a function of number of servo samples (or time).

Since a seek longer than 10,000 tracks is not being performed, the variable-bandwidth low-pass filter only has regions which correspond with regions B and C of FIG. 6. More specifically, in the example of FIG. 9, the variable-bandwidth low-pass filter has a bandwidth of 7 kHz when the number of tracks-to-go is less than or equal to 643 tracks. Accordingly, the low pass filter has a bandwidth of 7 kHz from the time the head is positioned at track number 19,357 until the time the head is positioned at track number 20,000 (i.e., the target track is 20,000 and the track number is 19,357, so tracks-to-go is 643 when the head is at track 19,357) as identified by Region B.

When the head is positioned between track number 10,000 and track number 19,357, which is identified by Region C in FIG. 9, the bandwidth of the low pass filter varies based upon the number of tracks-to-go. More specifically, the bandwidth is determined by performing a linear interpolation between the bandwidth at track number 10,000 and the bandwidth at track number 19,357, and is dependent upon the number of tracks-to-go.

FIG. 8 is a graphical representation of a VCM control signal for a seek of 10,000 tracks that has been shaped using a variable-bandwidth low-pass filter in accordance with the present invention for the exemplary disk drive described in connection with FIG. 9. In FIG. 8, the control signal (in amps) is plotted relative to number of servo samples (or time). Furthermore, as shown in FIG. 8, the control signal has a relatively smooth, sinusoidal shape, which reduces the seek acoustics of the drive. In addition, the rise and fall times of the VCM control signal are still relatively sharp, so that seek times are not significantly reduced. FIG. 8 differs from FIG. 5, in that it does not include a "coast" portion due to the relatively shorter seek length.

FIG. 10 is a graphical representation of position error (in tracks) plotted relative to number of servo samples (or time) for a seek from track number 10,000 to track number 20,000 using a VCM control current that has been shaped in accordance with the variable-bandwidth low-pass filter described in connection with FIGS. 8 and 9. FIG. 10 shows a smooth arrival to track number 20,000 without overshoot. More specifically, the figure shows that the head is less than 10% off-track when arriving at track number 20,000.

It should be understood that locations (relative to the number of tracks-to-go) are exemplary in nature and are not the same for all disk drives. In addition, the corresponding bandwidths at such locations are not the same for all disk drives.

The inventors have recognized that the use of a low-pass filter during the acceleration phase serves to smooth out the control signal supplied to the VCM due to slewing. However, if the same low-pass filter was used during the deceleration phase, the servo system would have a tendency of becoming unstable, especially near the target track. The inventors have determined that, by relaxing the low-pass filter as the target track is approached, the servo instability problems may be overcome.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a disk surface;
providing a head which is moveable relative to the disk surface by a voice-coil motor;
generating a control signal that is delivered to the voice-coil motor to perform a seek operation, wherein the control signal is shaped by a variable-bandwidth low-pass filter; and
changing a bandwidth of the variable-bandwidth low-pass filter during the seek operation.

2. The method of claim 1, wherein the variable-bandwidth low-pass filter has bandwidths which are dependent upon a position of the head relative to a target track.

3. The method of claim 2, wherein the position of the head is determined relative to a number of tracks-to-go before reaching the target track and the bandwidths of the variable-bandwidth low-pass filter are dependent upon the number of tracks-to-go.

4. The method of claim 3, wherein the variable-bandwidth low-pass filter has a first bandwidth when the head is at a first position which is greater than a first number of tracks-to-go, the variable-bandwidth low-pass filter has a second bandwidth when the head is at a second position which is less than a second number of tracks-to-go and the first and second positions occur during the seek operation.

5. The method of claim 4, wherein the variable-bandwidth low-pass filter has bandwidths that are determined by interpolation when the head is positioned between the first position and the second position.

6. The method of claim 5, wherein the interpolation is a linear interpolation.

7. The method of claim 6, wherein the first bandwidth is less than the second bandwidth.

8. The method of claim 6, wherein the number of tracks-to-go at the first position is greater than the number of tracks-to-go at the second position.

9. The method of claim 4, wherein the first bandwidth is approximately 100 Hz.

10. The method of claim 4, wherein the first number of tracks-to-go is about 10,000 tracks.

11. The method of claim 4, wherein the second bandwidth is approximately 7 kHz.

12. The method of claim 4, wherein the second number of tracks-to-go is about 643 tracks.

13. The method of claim 1, including the step of:
providing a variable feedback to the variable-bandwidth low-pass filter to ensure stability.

14. The method of claim 13, wherein the variable feedback is dependent upon a number of tracks-to-go before the head reaches a target track.

15. A disk drive comprising:
a disk surface having a plurality of tracks defined thereon;
a head associated with the disk surface; and,
a voice-coil motor for moving the head towards a target track in response to a control signal associated with a seek operation, said control signal being shaped during the seek operation by a variable-bandwidth low-pass filter having a bandwidth that is changed during the seek operation.

16. The disk drive of claim 15, wherein the variable-bandwidth low-pass filter has bandwidths which are dependent upon a position of the head relative to the target track.

17. The disk drive of claim 16, wherein the position of the head is determined relative to a number of tracks-to-go before reaching the target track and the bandwidths of the variable-bandwidth low-pass filter are dependent upon the number of tracks-to-go.

18. The disk drive of claim 17, wherein the variable-bandwidth low-pass filter has a first bandwidth when the head is at a first position which is greater than a first number of tracks-to-go, the variable-bandwidth low-pass filter has a second bandwidth when the head is at a second position which is less than a second number of tracks-to-go and the first and second positions occur during the seek operation.

19. The disk drive of claim 18, wherein the variable-bandwidth low-pass filter has bandwidths that are determined by interpolation when the head is positioned between the first position and the second position.

20. The disk drive of claim 19, wherein the interpolation is a linear interpolation.

21. The disk drive of claim 20, wherein the first bandwidth is less than the second bandwidth.

22. The disk drive of claim 20, wherein the number of tracks-to-go at the first position is greater than the number of tracks-to-go at the second position.

23. The disk drive of claim 18, wherein the first bandwidth is approximately 100 Hz.

24. The disk drive of claim 18, wherein the first number of tracks-to-go is about 10,000 tracks.

25. The disk drive of claim 18, wherein the second bandwidth is approximately 7 kHz.

26. The disk drive of claim 18, wherein the second number of tracks-to-go is about 643 tracks.

27. The disk drive of claim 15, wherein a variable feedback is provided to the variable-bandwidth low-pass filter.

28. The disk drive of claim 27, wherein the variable feedback is dependent upon a number of tracks-to-go before the head reaches the target track.

29. A method comprising the steps of:
moving a head associated with a disk surface towards a target track in response to a seek control signal during a seek operation; and,
shaping said seek control signal during the seek operation using a variable-bandwidth low-pass filter having a bandwidth that is changed during the seek operation.

30. The method of claim 29, wherein the variable-bandwidth low-pass filter has a plurality of bandwidths and wherein the method includes the step of:
  determining the plurality of bandwidths based upon a number of tracks-to-go between the head and the target track.

31. The method of claim 30, wherein the variable-bandwidth low-pass filter has a first bandwidth when the head is at a first position which is greater than a first number of tracks-to-go, the variable-bandwidth low-pass filter has a second bandwidth when the head is at a second position which is less than a second number of tracks-to-go and the first and second positions occur during the seek operation.

32. The method of claim 31, including the step of:
  determining bandwidths of the variable-bandwidth low-pass filter by interpolation for head positions between the first position and the second position.

33. The method of claim 32, including the step of:
  providing a variable feedback to the variable-bandwidth low-pass filter.

34. The method of claim 33, wherein the variable feedback is dependent upon the number of tracks-to-go.

35. In a disk drive that includes a disk, a head that reads from and writes to the disk, and a voice coil motor that moves the head from a present track on the disk to a target track on the disk in response to a control signal during a seek operation, a method for performing the seek operation, comprising:
  shaping the control signal during the seek operation using a variable-bandwidth low-pass filter, wherein the variable bandwidth of the variable-bandwidth low-pass filter changes during the seek operation as the head moves towards the target track as a function of a number of tracks between the head and the target track; and
  delivering the shaped control signal to the voice coil motor.

36. The method of claim 35, wherein the variable bandwidth increases as the head moves towards the target track.

37. The method of claim 35, wherein the variable bandwidth is a first bandwidth when the head is greater than a first number of tracks from the target track, and the variable bandwidth is greater than the first bandwidth when the head is less than the first number of tracks from the target track.

38. The method of claim 35, wherein the variable bandwidth is a second bandwidth when the head is less than a second number of tracks from the target track, and the variable bandwidth is less than the second bandwidth when the head is greater than the second number of tracks from the target track.

39. The method of claim 35, wherein the variable bandwidth is a first bandwidth when the head is greater than a first number of tracks from the target track, the variable bandwidth is a second bandwidth when the head is less than a second number of tracks from the target track, and the variable bandwidth is greater than the first bandwidth and less than the second bandwidth when the head is less than the first number of tracks from the target track and greater than the second number of tracks from the target track.

40. The method of claim 39, wherein the variable bandwidth is a linear interpolation between the first and second bandwidths when the head is less than the first number of tracks from the target track and greater than the second number of tracks from the target track.

41. The method of claim 39, wherein the first bandwidth is approximately 100 Hz.

42. The method of claim 39, wherein the second bandwidth is approximately 7000 Hz.

43. The method of claim 39, wherein the first number of tracks is approximately 10,000 tracks.

44. The method of claim 39, wherein the second number of tracks is approximately 643 tracks.

45. The method of claim 35, wherein the variable-bandwidth low-pass filter shapes the control signal using during acceleration and deceleration phases of the seek operation.

46. The method of claim 45, wherein the variable bandwidth is smaller during the acceleration phase than during the deceleration phase.

47. The method of claim 35, wherein the variable-bandwidth low-pass filter shapes the control signal to have a relatively smooth, sinusoidal shape.

48. The method of claim 47, wherein the sinusoidal shape includes a coast region.

49. The method of claim 47, wherein the sinusoidal shape excludes a coast region.

50. The method of claim 35, wherein the variable-bandwidth low-pass filter shapes the control signal to reduce acoustics.

51. The method of claim 50, wherein the variable-bandwidth low-pass filter shapes the control signal to excite fewer mechanical resonances, thereby reducing acoustics.

52. The method of claim 35, including providing a variable feedback gain to the variable-bandwidth low-pass filter that changes as the head moves towards the target track as a function of the number of tracks between the head and the target track.

53. The method of claim 52, wherein the variable feedback gain decreases as the head moves towards the target track.

54. The method of claim 52, wherein the variable feedback gain is a first feedback gain when the head is greater than a first number of tracks from the target track, the variable feedback gain is a second feedback gain when the head is less than a second number of tracks from the target track, and the variable feedback gain is less than the first feedback gain and greater than the second feedback gain when the head is less than the first number of tracks from the target track and greater than the second number of tracks from the target track.

55. In a disk drive that includes a disk, a head that reads from and writes to the disk, and a voice coil motor that moves the head from a present track on the disk to a target track on the disk in response to a control signal during a seek operation, a method for performing the seek operation, comprising:
  shaping the control signal during the seek operation using a variable-bandwidth low-pass filter during acceleration and deceleration phases of the seek operation, wherein the variable bandwidth of the variable-bandwidth low-pass filter is a first bandwidth when the head is greater than a first number of tracks from the target track, the variable bandwidth is a second bandwidth when the head is less than a second number of tracks from the target track, the variable bandwidth is greater than the first bandwidth and less than the second bandwidth when the head is less than the first number of tracks from the target track and greater than the second number of tracks from the target track, and the variable bandwidth is smaller during the acceleration phase than during the deceleration phase; and delivering the shaped control signal to the voice coil motor.

56. The method of claim 55, wherein the variable bandwidth is a linear interpolation between the first and second bandwidths when the head is less than the first number of tracks from the target track and greater than the second number of tracks from the target track.

57. The method of claim 55, wherein the first bandwidth is approximately 100 Hz.

58. The method of claim 55, wherein the second bandwidth is approximately 7000 Hz.

59. The method of claim 55, wherein the first number of tracks is approximately 10,000 tracks.

60. The method of claim 55, wherein the second number of tracks is approximately 643 tracks.

61. The method of claim 55, wherein the variable-bandwidth low-pass filter shapes the control signal to have a relatively smooth, sinusoidal shape that includes a positive pulse during the acceleration phase and a negative pulse during the deceleration phase.

62. The method of claim 55, wherein the variable-bandwidth low-pass filter shapes the control signal to excite fewer mechanical resonances, thereby reducing acoustics.

63. The method of claim 55, including providing a variable feedback gain to the variable-bandwidth low-pass filter that changes as the head moves towards the target track as a function of a number of tracks between the head and the target track.

64. The method of claim 63, wherein the variable feedback gain is a first feedback gain when the head is greater than the first number of tracks from the target track, the variable feedback gain is a second feedback gain when the head is less than the second number of tracks from the target track, and the variable feedback gain is less than the first feedback gain and greater than the second feedback gain when the head is less than the first number of tracks from the target track and greater than the second number of tracks from the target track.

* * * * *